US008711377B2

(12) United States Patent  (10) Patent No.: US 8,711,377 B2
Negishi  (45) Date of Patent: Apr. 29, 2014

(54) IMAGE FORMING APPARATUS, CONTROL METHOD OF IMAGE FORMING APPARATUS, AND STORAGE MEDIUM

(75) Inventor: Akira Negishi, San Mateo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 180 days.

(21) Appl. No.: 13/192,146

(22) Filed: Jul. 27, 2011

(65) Prior Publication Data

US 2012/0050774 A1 Mar. 1, 2012

(30) Foreign Application Priority Data

Aug. 27, 2010 (JP) ................................. 2010-191204

(51) Int. Cl.
*G06K 15/02* (2006.01)
(52) U.S. Cl.
USPC ........ 358/1.13; 358/1.16; 358/1.15; 715/235; 709/234
(58) Field of Classification Search
None
See application file for complete search history.

(56) References Cited

U.S. PATENT DOCUMENTS

| 5,740,338 | A | * | 4/1998 | Gauthier et al. | ............. | 358/1.17 |
| 5,983,243 | A | * | 11/1999 | Heiney et al. | ................ | 715/235 |
| 6,965,440 | B1 | * | 11/2005 | Nakagiri et al. | ............ | 358/1.12 |
| 8,223,387 | B2 | * | 7/2012 | Nakao et al. | ................ | 358/1.18 |
| 2003/0159114 | A1 | * | 8/2003 | Nishikawa et al. | .......... | 715/530 |
| 2006/0055975 | A1 | * | 3/2006 | Toda | ............................ | 358/1.16 |
| 2006/0248454 | A1 | * | 11/2006 | Giannetti | ...................... | 715/517 |
| 2006/0279780 | A1 |   | 12/2006 | Anno | | |
| 2006/0279814 | A1 | * | 12/2006 | Fukada et al. | ................ | 358/540 |
| 2007/0253027 | A1 | * | 11/2007 | Hiebert | ........................ | 358/1.18 |
| 2008/0165382 | A1 | * | 7/2008 | Ferlitsch | ...................... | 358/1.15 |
| 2009/0128850 | A1 | * | 5/2009 | Oshima | ....................... | 358/1.15 |

FOREIGN PATENT DOCUMENTS

| CN | 101071364 A | 11/2007 |
| CN | 101131630 A | 2/2008 |
| JP | 2006-215819 A | 8/2006 |

* cited by examiner

*Primary Examiner* — Ashish K Thomas
(74) *Attorney, Agent, or Firm* — Canon USA, Inc., IP Division

(57) ABSTRACT

A CPU is provided to, when at least one of a first print job and a second print job as merging targets is a variable data printing (VDP) job, display a user interface for prompting a user to select a merging method for merging the first print job and the second print job and merge the first print job and the second print job according to the merging method selected via the user interface.

12 Claims, 14 Drawing Sheets

FIG.4

| 401 | 402 | 403 | 404 | 405 | 406 | 407 |
|---|---|---|---|---|---|---|
| CLIENT NO. | NAME | ADDRESS | AGE | Master | VDP Object 1 | VDP Object 2 |
| 00111 | YAMADA | KANAGAWA | 26 | Link A | Link XXXX | Link KKKK |
| 00456 | SUZUKI | TOKYO | 39 | Link A | Link YYYY | Link KKKK |
| 00684 | SATO | HOKKAIDO | 55 | Link A | Link ZZZZ | Link TTTT |

IMAGE FORMING APPARATUS, CONTROL METHOD OF IMAGE FORMING APPARATUS, AND STORAGE MEDIUM

BACKGROUND OF THE INVENTION

1. Field of the Invention

The present invention relates to an image forming apparatus having a variable data printing function, a control method of an image forming apparatus, and a storage medium.

2. Description of the Related Art

Conventionally, image forming apparatuses are generally provided with a function to merge a print job stored in a raster image processor (RIP) based on the unit of a job or a page. This function is used as means for simply gathering, as one job, print jobs created by different application software, or for quickly performing processing for simply inserting a page without returning to the application software.

Recently, a demand of variable data printing (VDP) has been increased to print data matching individual needs of clients. In the variable data printing, registered client data is printed for one job based on the unit of a record. The record is a unit of a series of VDP processing. In the case of printing based on the unit of a client, one record contains print data corresponding to one client.

In the variable data printing, one job can include a large number of records. For example, one job can include several to tens of thousands of records. In the variable data printing, a variable object for varying content thereof depending on the record is associated with the job, is combined to a master object as a common background of the record, and is printed. If the job in the VDP includes a plurality of records, the records are managed based on the unit of a job, and the job is referred to as a VDP job.

An object used plural times in the VDP job is referred to as a reusable object. The reusable object stores intermediate data or a bit map image that is rasterized as an image once, and is reused at the using time after the second time, so that the speed of processing time can be increased. The above mentioned master object is used as the reusable object as an example.

As the VDP is widely used, performing specific processing is considered in the case of the print job as the VDP job.

According to conventional art discussed in Japanese Patent Application Laid-Open No. 2006-215819, when a document file is imported, in the case of variable output data, a segment is temporarily set based on the unit of a record, and electronic document data with the set segment based on the record is generated.

The conventional art discussed in Japanese Patent Application Laid-Open No. 2006-215819, is subjected to the processing when importing the document file and only to set subsequent editing processing to be performed based on the unit of the record. In merging of the print jobs based on the unit of the job or page that has been widely executed before the variable data printing, processing suitable to the print job for the variable data printing is not performed.

For example, a using case is considered to create a direct mail personalized every client as a variable data print job, store the mail to the RIP, and add news of two pages of a new store. In the conventional merging of the print jobs, all of the variable data print jobs are printed and only an additional print job corresponding to the two pages is then printed. However, in this case, it is expected that the additional jobs corresponding to the two pages are printed to the ends of all records based on the unit of the client.

Assuming another example that a direct mail personalized every client is created as the variable data print job, and is stored to the RIP. Then, a page of March as the corresponding month is inserted from information about limited-time sales with one page every month from January to December.

In that case, the merging is performed based on the unit of a page, and in a state of displaying thumbnail images of both print jobs, a fourth page of a job of the information about the time-limited sales is inserted back to a first page of a first record of the variable data print job of the direct mail with drag and drop. On the other hand, with the conventional merging based on the unit of the page, the page is simply inserted back to the first page of the first record, but is not inserted to another record. However, in this case, it is expected that a page of April is inserted back to the first pages of all records.

Although the variable data print job has been gradually used in recent years, the variable data print job has an issue that the conventional merging processing based on the unit of the job or page may not be successfully performed as expected.

SUMMARY OF THE INVENTION

One aspect of the present invention is directed to provide an image forming apparatus with improvement in handling convenience of a variable data print job by allowing a user to select, whether the conventional merging is performed or merging is performed in consideration of a record of the variable data print job, according to as whether a variable data print job is a merging target when merging the print jobs.

According to another aspect of the present invention, an image forming apparatus includes a display unit configured to, when at least one of a first print job and a second print job as merging targets is a variable data printing (VDP) job, display a user interface for prompting a user to select a merging method for merging the first print job and the second print job, and a merging unit configured to merge the first print job and the second print job according to the merging method selected via the user interface.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a record database.

DESCRIPTION OF THE EMBODIMENTS

Various exemplary embodiments, features, and aspects of the invention will be described in detail below with reference to the drawings.

[Image Forming System]

First, a description is given of an image forming system according to an exemplary embodiment.

Figure 1:
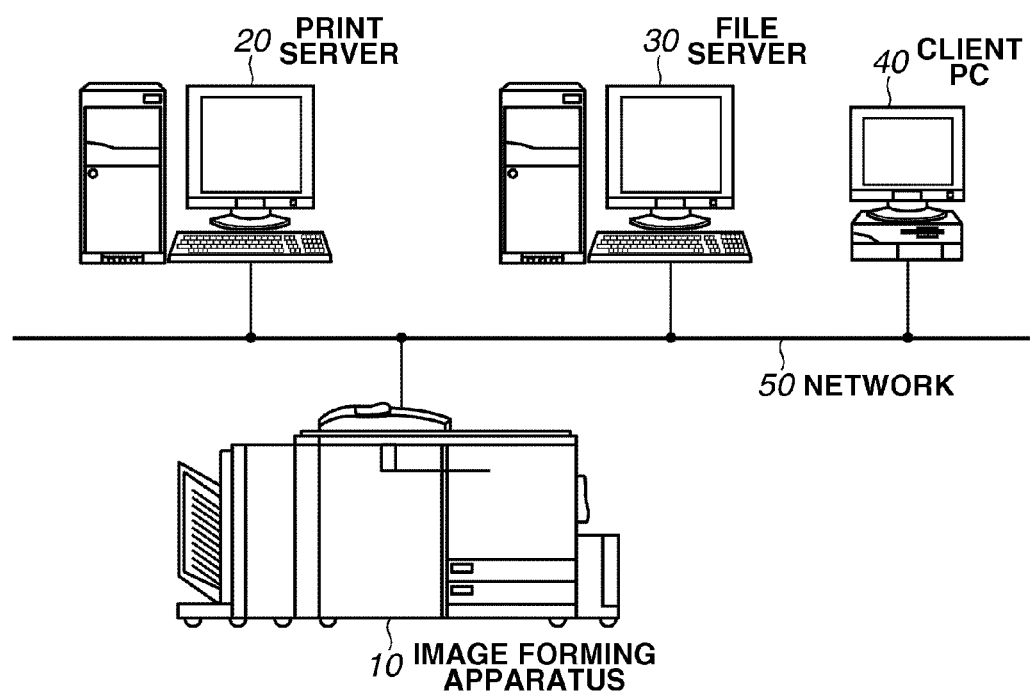
FIG. 1 illustrates a configuration of an image forming system.

FIG. 1 illustrates an example of a configuration of the image forming system according to the present exemplary embodiment of the present invention. The image forming system according to the present exemplary embodiment includes an image forming apparatus 10, a print server 20, a file server 30, and a client personal computer (PC) 40. The image forming apparatus 10, the print server 20, the file server 30, and the client PC 40 are connected to be communicable with each other via a network 50 such as a local area network (LAN) or a wide area network (WAN).

The image forming apparatus 10 includes various functions such as scanning, printing, and copying. The print server 20 manages an input print job and the image forming apparatus 10 that is connected thereto via the network 50. The print server 20 can monitor the situation of the image forming apparatus 10 connected thereto and all print jobs, and control the suspension, setting change, and printing restart of the print job, or copying, movement, and deletion of the job.

The file server 30 stores a database of variable data to be used for variable data printing, e.g., a client database of client data including a destination, an address, and a name. The client PC 40 has a function for editing an application file or instructing the printing. The client PC 40 also has a function for supporting the monitoring and control of the image forming apparatus 10 and the print job that are managed in the print server 20. A user can check a status of the job using the client PC 40.

[Hardware Configuration of Image Forming Apparatus]

Figure 2:
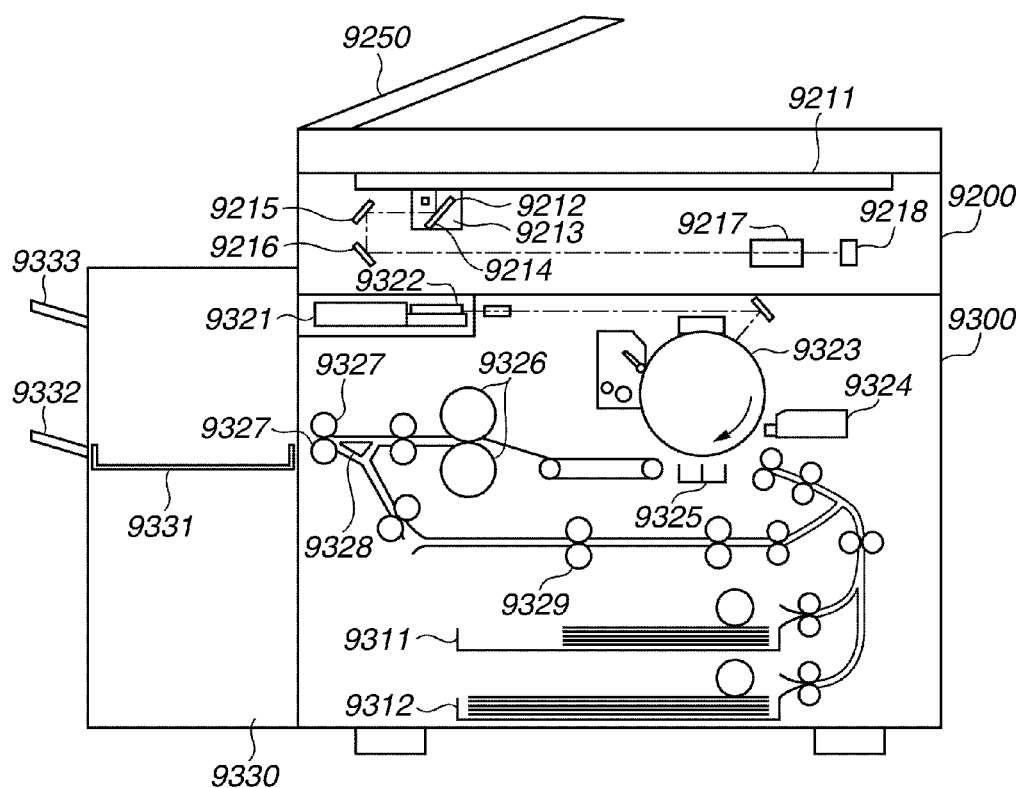
FIG. 2 illustrates a configuration of an image forming apparatus.

FIG. 2 schematically illustrates a hardware configuration of the image forming apparatus 10 in FIG. 1.

A scanner unit includes a document sheet feeding unit 9250. The document sheet feeding unit 9250 sequentially feeds the document one by one to a platen glass 9211 from the head. Each time when the reading operation of the document is completed, the document sheet feeding unit 9250 discharges the document from the platen glass 9211 to a sheet discharge tray. When the document is fed to the platen glass 9211, a reader unit 2070 turns on a lamp 9212, and a movement unit 9213 starts to move.

With the movement of the movement unit 9213, the document on the platen glass 9211 is read and scanned. During the reading and scanning, reflection light from the document is guided to a charge-coupled device image sensor (hereinafter, referred to as a CCD) 9218 via mirrors 9214, 9215, and 9216 and a lens 9217, and an image on the document is formed onto an image capturing surface of the CCD 9218. The CCD 9218 converts the image formed on the image capturing surface into an electrical signal, and the electrical signal is input to a control device after predetermined processing.

A printer unit includes a laser driver 9321. The laser driver 9321 drives a laser beam emission unit 9322 based on image data input from a control device 9110. Consequently, the laser beam emission unit 9322 emits laser beams corresponding to the image data, and a photosensitive drum 9323 is scanned and irradiated with the laser beams. An electrostatic latent image is formed onto the photosensitive drum 9323 with the laser beams. The electrostatic latent image is visualized as a toner image with toner supplied from a developer 9324.

Synchronously with the irradiation timing of the laser beams, a recording sheet is fed between the photosensitive drum 9323 and a transfer unit 9325 from cassettes 9311 and 9312 via a conveyance path. The toner image on the photosensitive drum 9323 is transferred onto the recording sheet fed from the transfer unit 9325.

The recording sheet to which the toner image is transferred is transmitted to a fixing roller pair (of a heating roller and a pressurizing roller) 9326 via a conveyance belt. The fixing roller pair 9326 thermally presses the recording sheet, and fixes the toner image on the recording sheet. The recording sheet that passes through the fixing roller pair 9326 is discharged to a sheet discharge unit 9330 by a sheet discharge roller pair 9327.

In the case of setting a two-sided recording mode, the recording sheet is conveyed to the sheet discharge roller pair 9327. Then, the rotational direction of the sheet discharge roller pair 9327 is inverted, and a flapper 9328 guides the recording sheet to a sheet re-feeding conveyance path 9339. The recording sheet guided to the sheet re-feeding conveyance path 9339 is re-fed between the photosensitive drum 9323 and the transfer unit 9325 at the above timing, and the toner image is transferred to the rear surface of the recording sheet.

The sheet discharge unit 9330 includes a sheet processing device that can perform post-processing such as sorting, punching, or stapling. A buffer 9331 temporarily stores the recording sheet before discharging the recording sheet to sheet discharge units 9332 and 9333. The sheet discharge units 9332 and 9333 can be moved up and down. The recording sheet stored in the buffer 9331 is discharged to any of the sheet discharge units 9332 and 9333.

[Configuration of Image Forming System]

Figure 3:
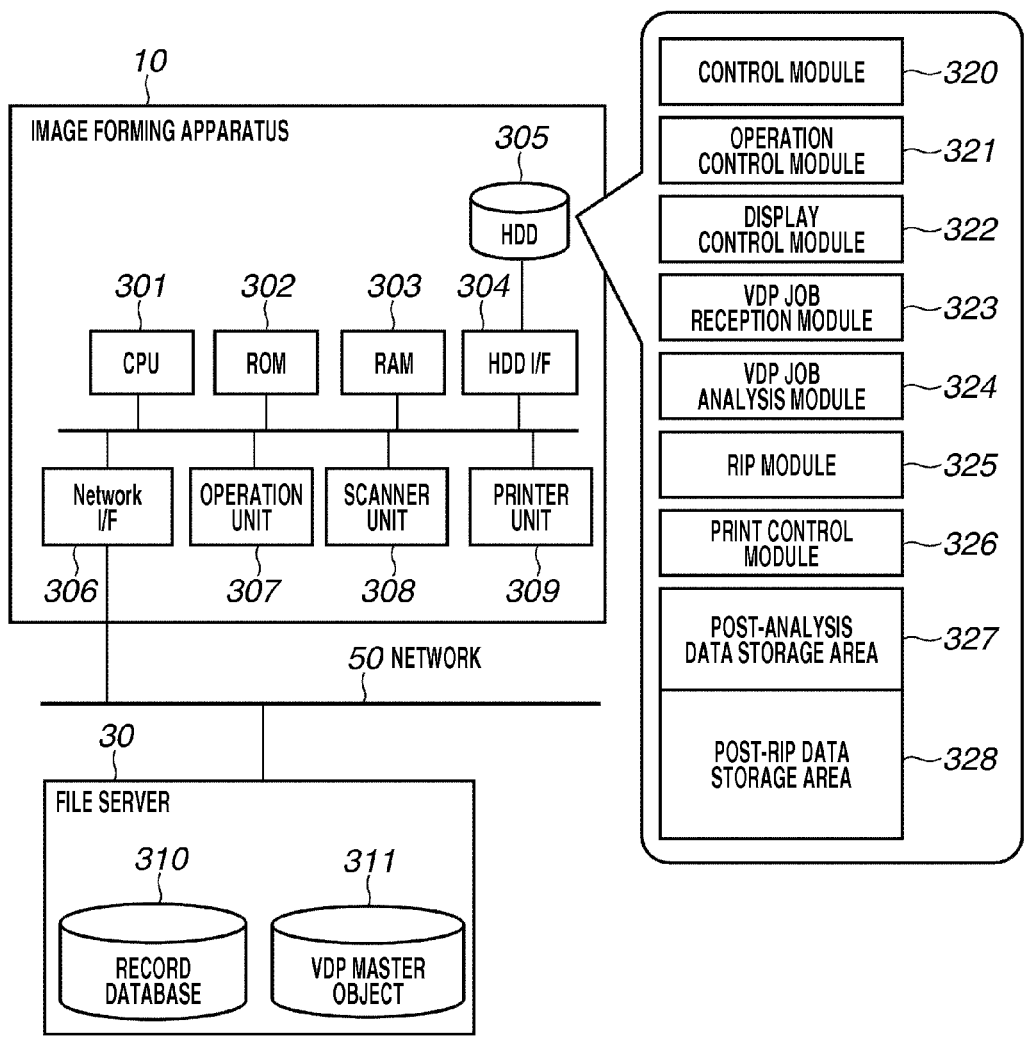
FIG. 3 illustrates a configuration of the image forming system.

FIG. 3 illustrates a block diagram of a configuration of the image forming system.

A central processing unit (CPU) 301 systematically controls processing and operations of various units provided for the image forming apparatus 10. An operation unit 307 is used to input various pieces of data by the user, and includes various keys. The operation unit 307 also displays a user interface (dialog box) that can be operated by the user on the screen under the control of the CPU 301. A read-only memory (ROM) 302 stores in advance various programs such as programs of a boot sequence or font information and the above-described program.

A random access memory (RAM) 303 can read and write data, and store the image data transmitted via a network interface (I/F) unit 306, various programs, and setting information. A hard disk drive (HDD) 305 is a large-capacity storage device for storing image data or the like and can store a plurality of pieces of data such as print data of a job as a processing target. The network I/F unit 306 is connected to the network 50, and transmits and receives the image data from/to a facsimile, a network connection device, or an external dedicated device. A scanner unit 308 reads the document on the document sheet feeding unit 9250, and generates the image data. A printer unit 309 prints the image data received from the scanner unit 308 or the network I/F unit 306.

A control module 320 and functional modules 321 to 326 are control programs that are read from the HDD 305 on the image forming apparatus 10, are stored in the RAM 303, and are operated by the CPU 301 on the image forming apparatus 10. The control module 320 controls the functional modules 320 to 326 in the image forming apparatus 10, and further controls the entire operation of the image forming apparatus 10.

An operation control module 321 receives inputs through various keys on the operation unit 307. The operation control module 321 notifies the control module 320 of input contents of various keys. The control module 320 performs processing such as reprinting or cancel of the job to the functional modules 321 to 326 according to the contents notified from the operation control module 321.

The display control module 322 performs various display, and controls a display device such as a liquid crystal display (LCD) or a light emission device (LED) on the operation unit 307.

The VDP job reception module 323 receives a VDP job input via the network I/F unit 306 from the client PC 40, and stores the received VDP job to the HDD 305. After ending the processing, the VDP job reception module 323 notifies the control module 320 of the end of processing. In response to the notification, the control module 320 instructs a VDP job analysis module 324 to analyze the VDP job.

The VDP job analysis module 324 refers to and sequentially analyzes the VDP job received from the VDP job reception module 323 and the record database 310 stored in the file server 30 in response to the instruction of the control module 320. In this case, the VDP job analysis module 324 refers to a master object and a VDP (variable data printing) object 311 referred to by the record, and associates these objects with each other.

The VDP job analysis module 324 stores the analyzed record to a post-analysis data storage area 327. The post-analysis data storage area 327 stores the record received from the VDP job analysis module 324 to the HDD 305. After ending the above processing, the VDP job analysis module 324 notifies the control module 320 of the end of processing. The control unit 320 instructs an RIP module 325 to perform raster image processor (RIP) processing of the post-analysis data in response to the notification.

The RIP module 325 reads the post-analysis data from the post-analysis data storage area 327 in response to the instruction of the control module 320, and performs RIP processing. The RIP module 325 also stores the post-RIP data to a post-RIP storage area 328. After ending the processing, the RIP module 325 notifies the control module 320 of the end of processing. The control module 320 instructs the print control module 326 to perform print processing of the post-RIP data in response to the notification.

The print control module 326 receives the post-RIP data read from the post-RIP storage area 328 in response to the instruction of the control module 320, and performs print processing. The print control module 326 feeds a necessary medium based on print information, controls various hardware in FIG. 2, and performs the print processing with designated finishing setting or a designated output method. After ending the processing, the print control module 326 notifies the control module 320 of the end of processing.

[Record Database]

FIG. 4 illustrates a part of spreadsheet data read from the record database 310 stored in the file server 30 as an example.

Data fields 401 to 407 store data in the record data or the database. The data fields 401 to 407 respectively store a client number, a name, an address, an age, a link destination of the master object, a link destination of a VDP object 1, and a link destination of a VDP object 2.

[Job, Record, and Page]

Figure 5:
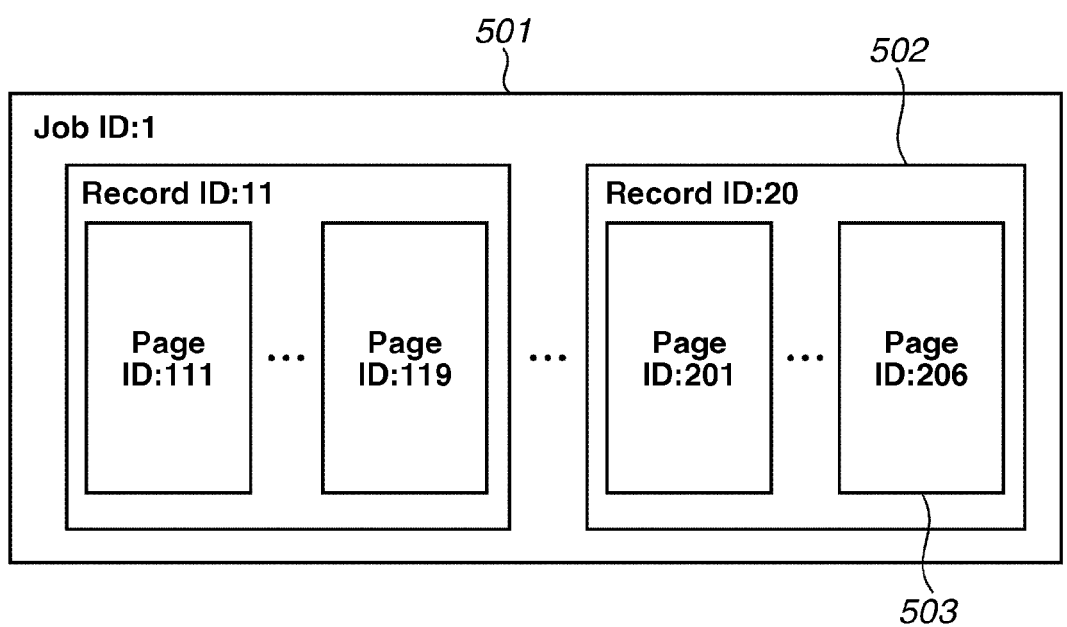
FIG. 5 illustrates an example of a layer structure of a job, a record, and a page.

FIG. 5 illustrates a relationship between a job, a record, and a page with layers according to the present exemplary embodiment. A VDP job 501 includes a plurality of records 502. The file server 30 stores record information as the base of the record 502. According to the present exemplary embodiment, the number of clients registered to the record database is the number of the records 502 as print targets. Each of the records 502 includes at least one page 503. The number of pages included in the respective records 502 may not be the same, and may be varied according to print contents instructed by the record 502.

[Print Job Management Utility]

Figure 6:
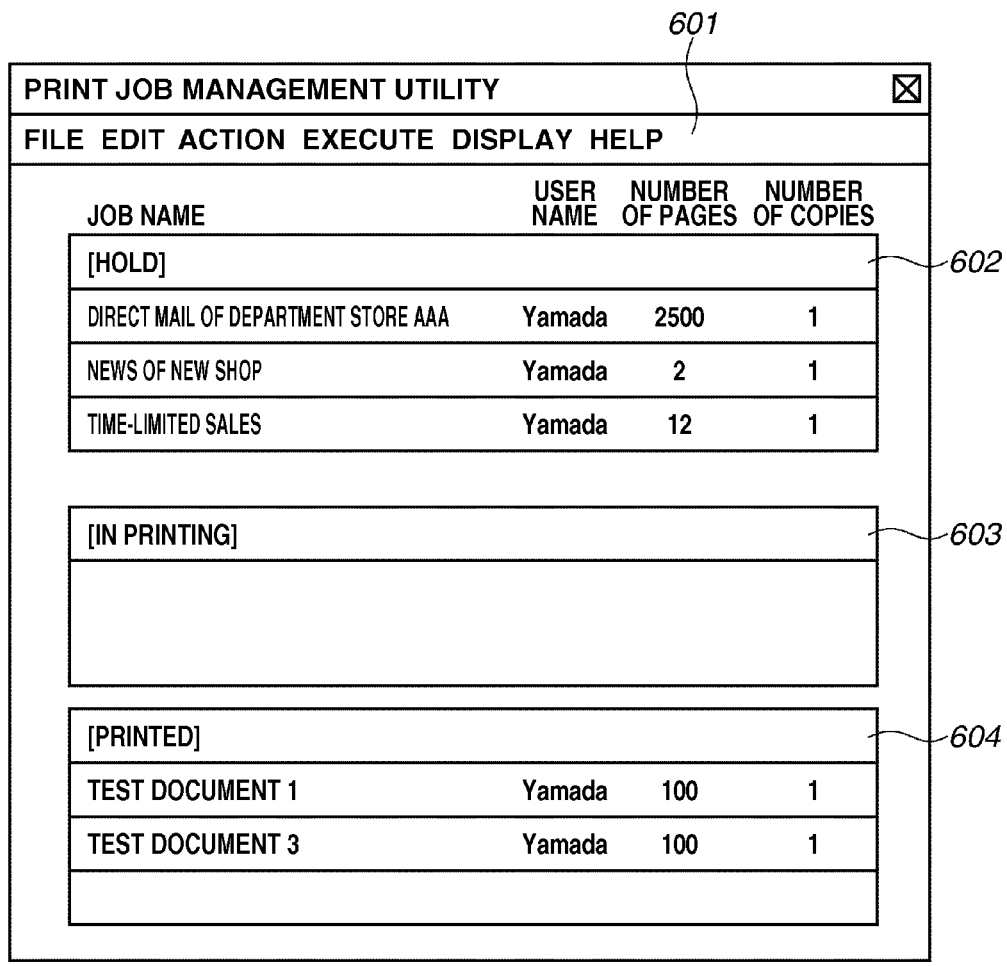
FIG. 6 illustrates a screen example of print job management utility.

FIG. 6 illustrates an example of a screen of print job management utility according to the present exemplary embodiment. The print job management utility is utility software for managing the print job of the image forming apparatus 10 via the network 50, and is installed to the client PC 40. A menu bar 601 displays a menu for various operations.

A hold job area 602 displays a list of the jobs held in the image forming apparatus 10. An in-printing job area 603 displays a list of the job whose print processing is being performed by the image forming apparatus 10. A printed-job area 604 displays a list of the job whose printing ends. The areas 602, 603, and 604 display a job name, a user name, a number of pages, and a number of copies of the print job. A list display item can be customized. When the areas 602, 603, and 604 include the jobs that are beyond the display thereof, a scroll bar appears and the jobs can be viewed with scroll.

[Merging Based on Unit of Job]

Figure 7:
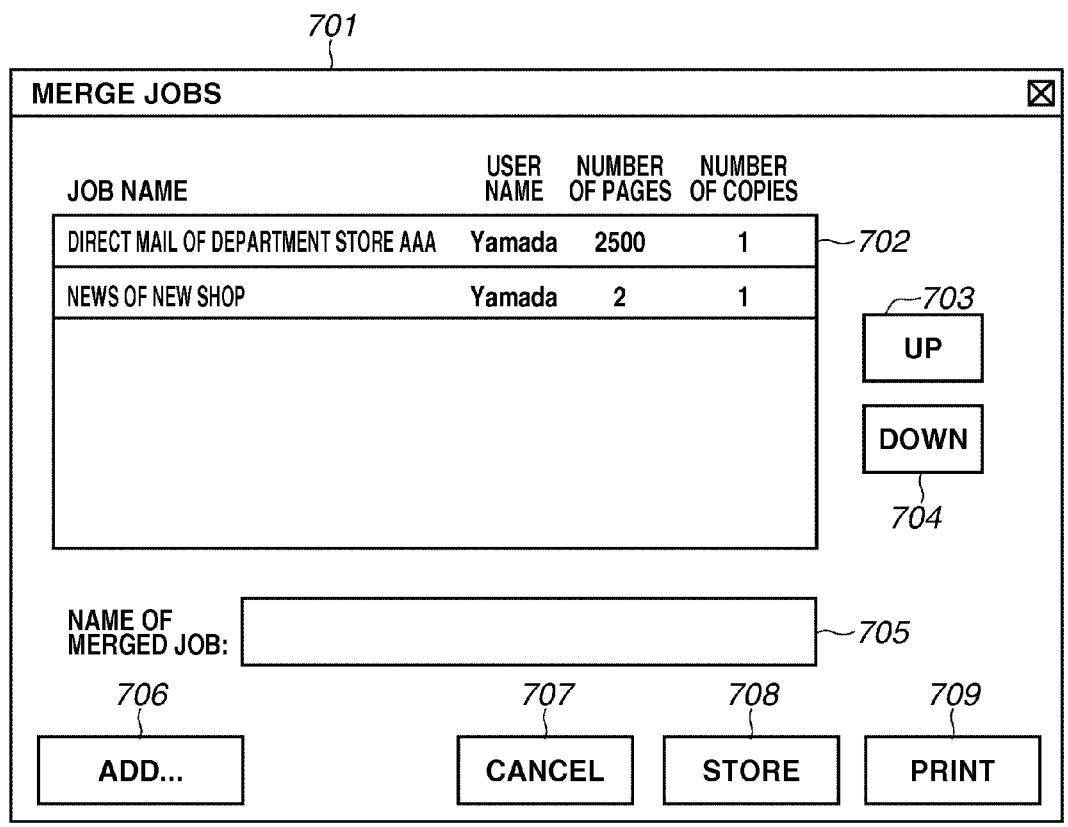
FIG. 7 illustrates a screen example of a dialog box of job merging.

FIG. 7 illustrates an example of a dialog box that is displayed when merging the jobs with the print job management utility. By selecting one or more jobs displayed in the hold job area 602 in the print job management utility in FIG. 6 and further selecting the job merging in action of the menu bar, a job merging dialog box 701 in FIG. 7 is displayed.

The selected job is displayed as a list in an area 702. By pressing an add button 706, the job held in the image forming apparatus 10 is selected and added to the job merging dialog box 701. By selecting one job listed-up in the job merging dialog box 701 and pressing an up button 703 or a down button 704, the job order can be changed. By inputting a character string to a text box 705, the name of the job after the merging can be set.

When a store button 708 is pressed, all jobs displayed in the job merging dialog box 701 are merged in the display order. The merged jobs are stored in the image forming apparatus 10 with the name in the text box 705. The hold job area 602 displays the job after the merging with the print job management utility. When a print button 709 is pressed, the job after the merging is printed by the image forming apparatus 10. When a cancel button 707 is pressed, the job merging dialog box 701 is closed without merging the jobs.

[Job Thumbnail and Merging Based on Unit of Page]

Figure 8:
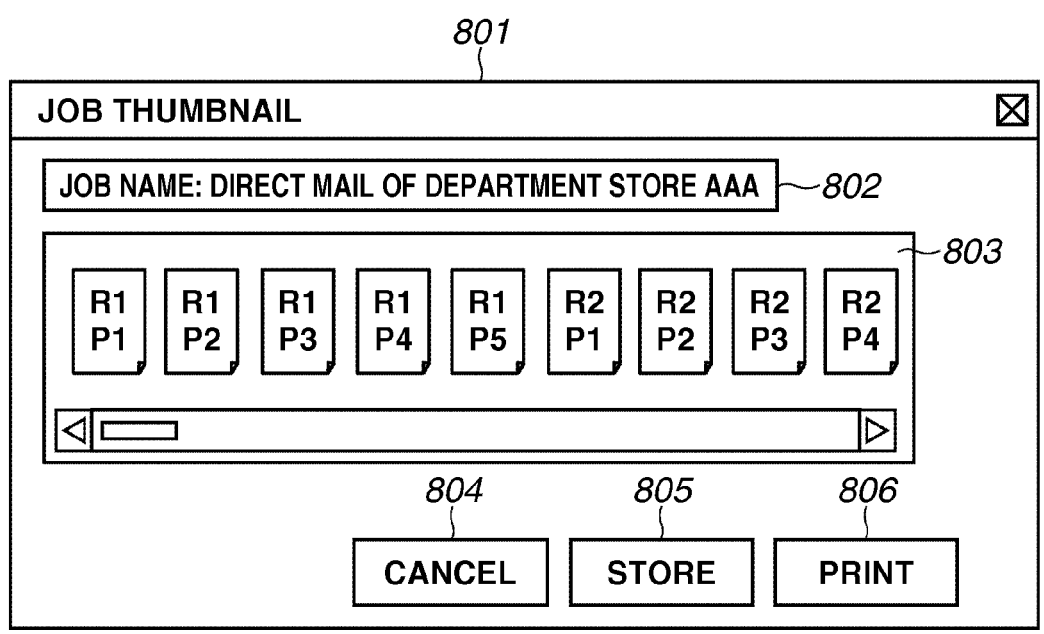
FIG. 8 illustrates a screen example of a dialog box of a job thumbnail.

FIG. 8 illustrates a dialog box displayed when viewing a job thumbnail with the print job management utility. By selecting one or more jobs displayed in the hold job area 602 in the print job management utility in FIG. 6 and further selecting a job thumbnail in action of the menu bar, a thumbnail dialog box 801 of a job in FIG. 8 is displayed.

The thumbnail dialog box 801 of the job displays a job name 802. Reduction images of pages of the job are displayed from the left to the right in a thumbnail area 803. When the reduction images are not all displayed in the thumbnail area 803, a scroll bar appears. Referring to FIG. 8, 'R1 P1' means a thumbnail of a first page (P1) of a first record (R1). Practically, the reduction image of a print image is displayed. With setting, the display may be switched with number display of a record number and a page number as illustrated in FIG. 8.

By selecting thumbnails corresponding to one page or a plurality of consecutive pages displayed on the thumbnail area 803 and dragging and dropping the thumbnails, the page order in the job can be changed. With the print job management utility, the thumbnail dialog boxes 801 of a plurality of jobs can be opened, and thumbnails of different jobs can be simultaneously displayed.

By selecting thumbnails corresponding to one page or a plurality of consecutive pages displayed in the thumbnail area 803 and further dragging and dropping the selected thumbnail to the thumbnail dialog box 801 of a different job, one page or a plurality of pages of a certain job can be inserted to a designated part of the different job.

After such editing operation, a store button 805 is pressed, so that the editing result is stored to the image forming apparatus 10. When a print button 806 is pressed, the image forming apparatus 10 prints the stored data according to the edited job. When a cancel button 804 is pressed, the editing operation is canceled and the thumbnail dialog box 801 is closed.

[Processing Flow of Merging Based on Unit of Job]

Figure 9:
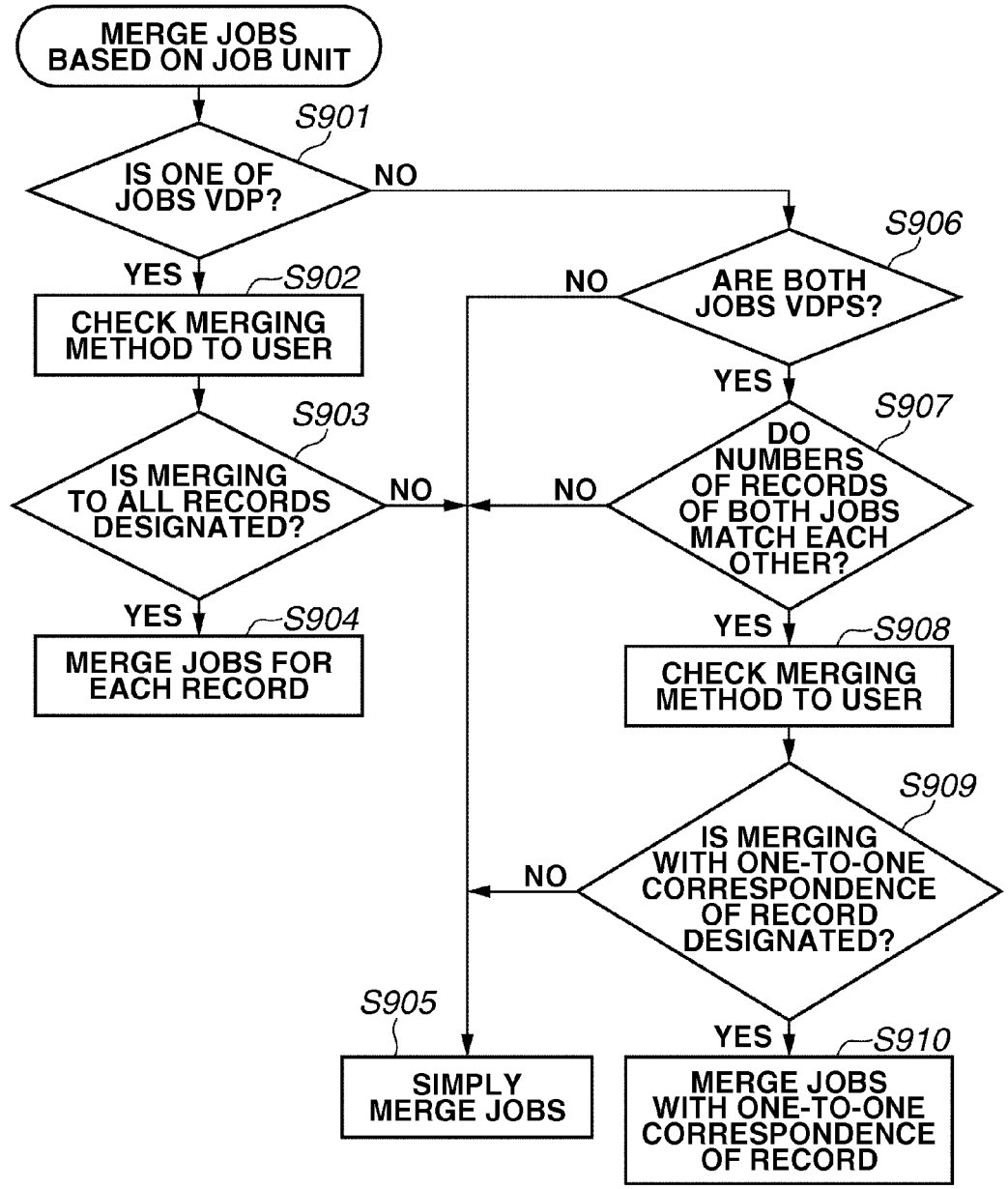
FIG. 9 illustrates a processing flow of merging based on the unit of a job.

FIG. 9 illustrates a processing flow of the CPU 301 when the merging of the print jobs based on the unit of job is designated.

In step S901, the CPU 301 determines whether one of two print jobs designated as merging targets is a VDP job. For determination of the VDP job, the CPU 301 checks whether the designated print job is described by a VDP language.

If the CPU 301 determines that one of the two print jobs is a VDP job (YES in step S901), the processing proceeds to step S902. If the CPU 301 determines that one of the two print jobs is not a VDP job (NO in step S901), that is, if both the two print jobs are VDP jobs or neither the two print jobs are VDP jobs, the processing proceeds to step S906.

Figure 10:
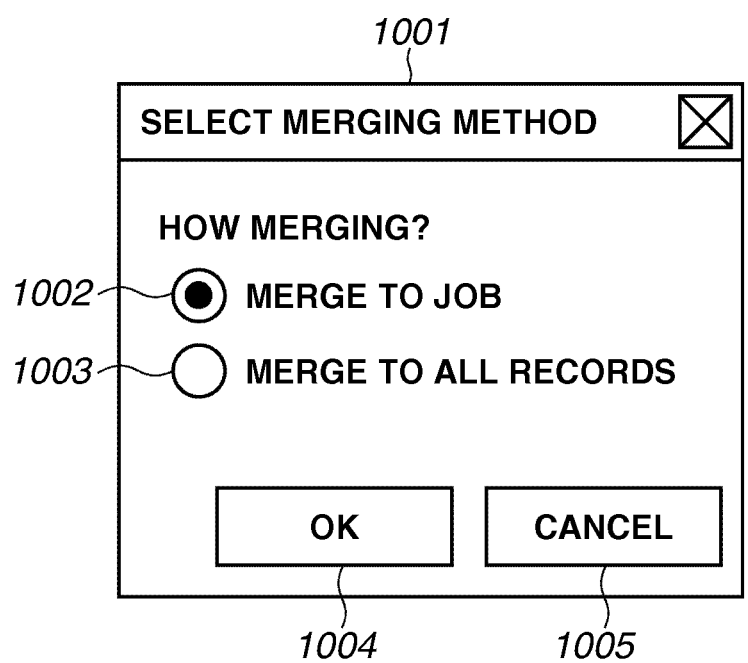
FIG. 10 illustrates a screen example of a dialog box for selecting a merging method based on the unit of the job.

In step S902, the CPU 301 displays a dialog box for promoting a user to select a merging method on the operation unit 307. FIG. 10 illustrates an example of a dialog box that is displayed at this time. In a dialog box 1001, the user can select 'merge to job' 1002 or 'merge to all records' 1003 as a job merging method.

After selecting the merging method, an OK button 1004 is selected and the processing then proceeds to step S903. When a cancel button 1005 is selected, merging processing based on the unit of job is canceled.

Here, the 'merge to job' means a merging method for simply merging a first print job and a second print job. The first and second print jobs are merged so that the first to final pages of the first print job are sequentially printed and then the first to final pages of the second print job are sequentially printed.

The 'merge to all records' means a method for merging the second print job to all of a plurality of records included in the VDP job as the first print job. When selecting the 'merge to all records', after printing the first record of the first print job, the first page to the final page of the second print job are sequentially printed. Further, after printing the second record of the first print job, the first page to the final page of the second print job are sequentially printed. The printing is repeated to the final record of the first print job in such a manner. This merging method is suitable to addition of a page with the same contents to all of a plurality of records included in the VDP job.

In step S903, the CPU 301 determines whether the 'merge to all records' is selected in the dialog box displayed in step S902. If the CPU 301 determines that the 'merge to all records' is selected (YES in step S903), the processing proceeds to step S904. On the other hand, if the CPU 301 determines that the 'merge to all records' is not selected (NO in step S903), the processing proceeds to step S905.

In step S904, the CPU 301 merges, to all of the plurality of records included in the print job as the VDP job, the print job as the non-VDP job in the two print jobs designated as the merging targets. In step S905, the CPU 301 simply merges the two print jobs designated as the merging targets with one after the other.

In step S906, the CPU 301 determines whether both the print jobs as the merging targets are VDP jobs. If the CPU 301 determines that both the print jobs as the merging targets are VDP jobs (YES in step S906), the processing proceeds to step S907. On the other hand, if the CPU 301 determines that both the print jobs as the merging targets are not VDP jobs, the processing proceeds to step S905.

In step S907, the CPU 301 checks the number of records included in the respective two VDP jobs as the merging targets, and determines whether the numbers of records in the two VDP jobs match each other. If the CPU 301 determines that the numbers of records match each other (YES in step S907), the processing advances to step S908. If the CPU 301 determines that the numbers of records do not match each other (NO in step S907), the processing returns to step S905.

Figure 11:
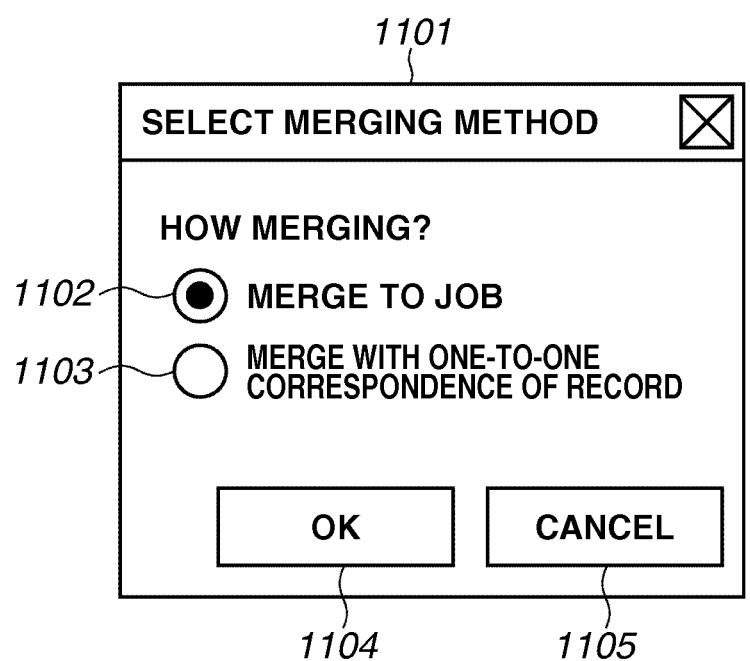
FIG. 11 illustrates a screen example of a dialog box for selecting a merging method based on the unit of the job.

In step S908, the CPU 301 displays a dialog box for promoting the user to select the merging method of the jobs on the operation unit 307. FIG. 11 illustrates an example of the dialog box to be displayed at this time. In the dialog box 1101, the user can select 'merge to job' 1102 or 'merge with one-to-one correspondence of record' 1103, as the merging method of the jobs.

After selecting the merging method, an OK button 1104 is selected, and the processing returns to step S903. When a cancel button 1105 is selected, the merging processing based on the unit of job is canceled.

The 'merge with one-to-one correspondence of record' is a merging method for merging the record included in the VDP job as the first print job to the record included in the VDP job as the second print job with one-to-one correspondence. When the 'merge with one-to-one correspondence of record' is selected, the print jobs are merged so that the first records of the first and second print jobs are sequentially printed and then the second to final records of the first and second print jobs are sequentially printed.

In step S909, the CPU 301 determines whether the 'merge with one-to-one correspondence of record' is selected in the dialog box displayed in step S908. When the CPU 301 determines that the 'merge with one-to-one correspondence of record' is selected (YES in step S909), the processing advances to step S910. On the other hand, when the CPU 301 determines that the 'merge with one-to-one correspondence of record' is not selected (NO in step S909), the processing returns to step S905. In step S910, the CPU 301 merges the plurality of records included in the two VDP jobs designated as the merging targets with one-to-one correspondence.

According to the above-described processing, when the print jobs are merged with each other, processing contents are switched according to whether the merged job is the VDP job. Thus, the user's desired merging can be realized and the convenience of handling of the VDP job is improved.

[Example of Merging Based on Unit of Job]

Figure 14:
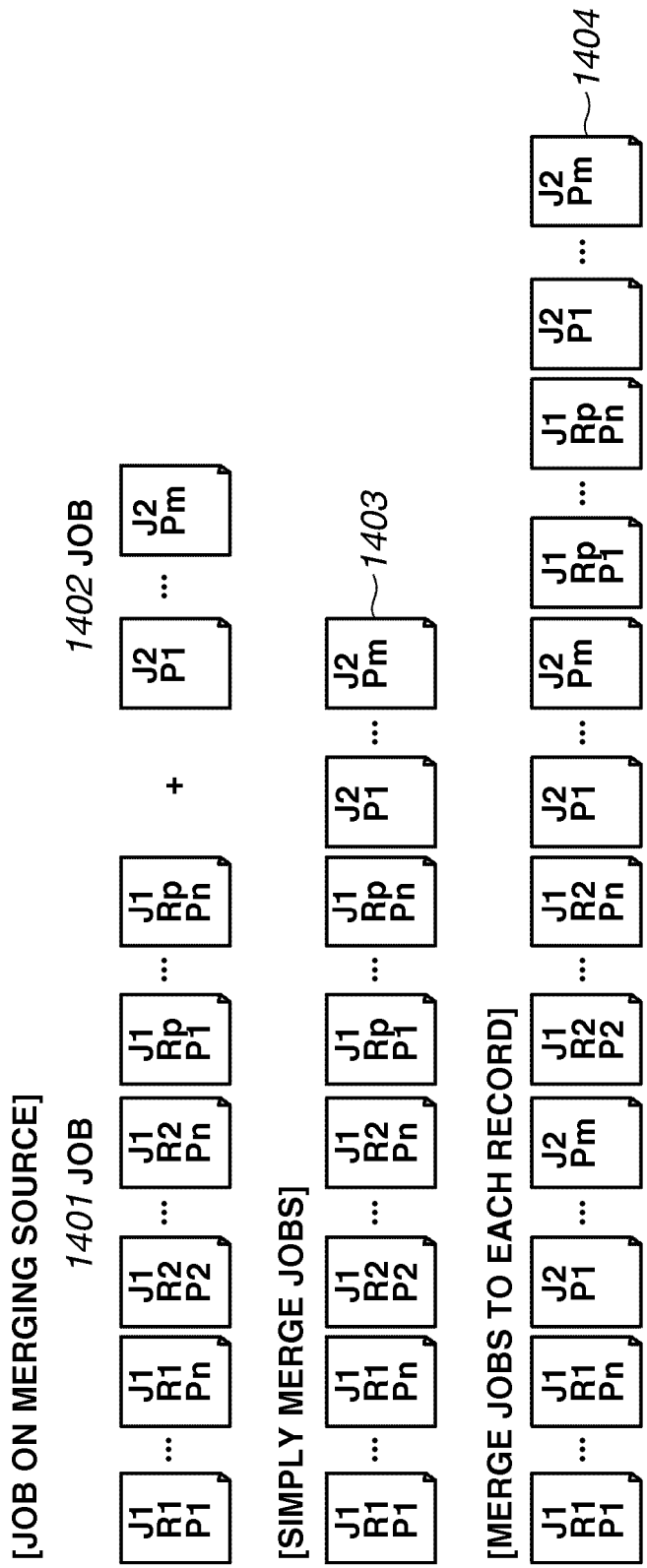
FIG. 14 illustrates an example of the merging based on the unit of the job.

FIG. 14 illustrates an example of merging based on the unit of job. The example is given of merging a job 1401 and a job 1402. The job 1401 is a VDP job, and 'J1 R1 P1' thereof means a first page (P) of a first record (R) of a first job (J). The job 1402 is a general job as a non-VDP job, and 'J2 P1' thereof means a first page (P) of a second job (J). A page configuration 1403 illustrates the case when the jobs are simply merged, in which the job 1402 is simply merged next to the job 1401. A page configuration 1404 illustrates a case when the jobs are merged for individual records, in which the job 1402 is merged next to jobs for the individual record in the job 1401.

[Processing Flow of Merging Based on Unit of Page]

Figure 12:
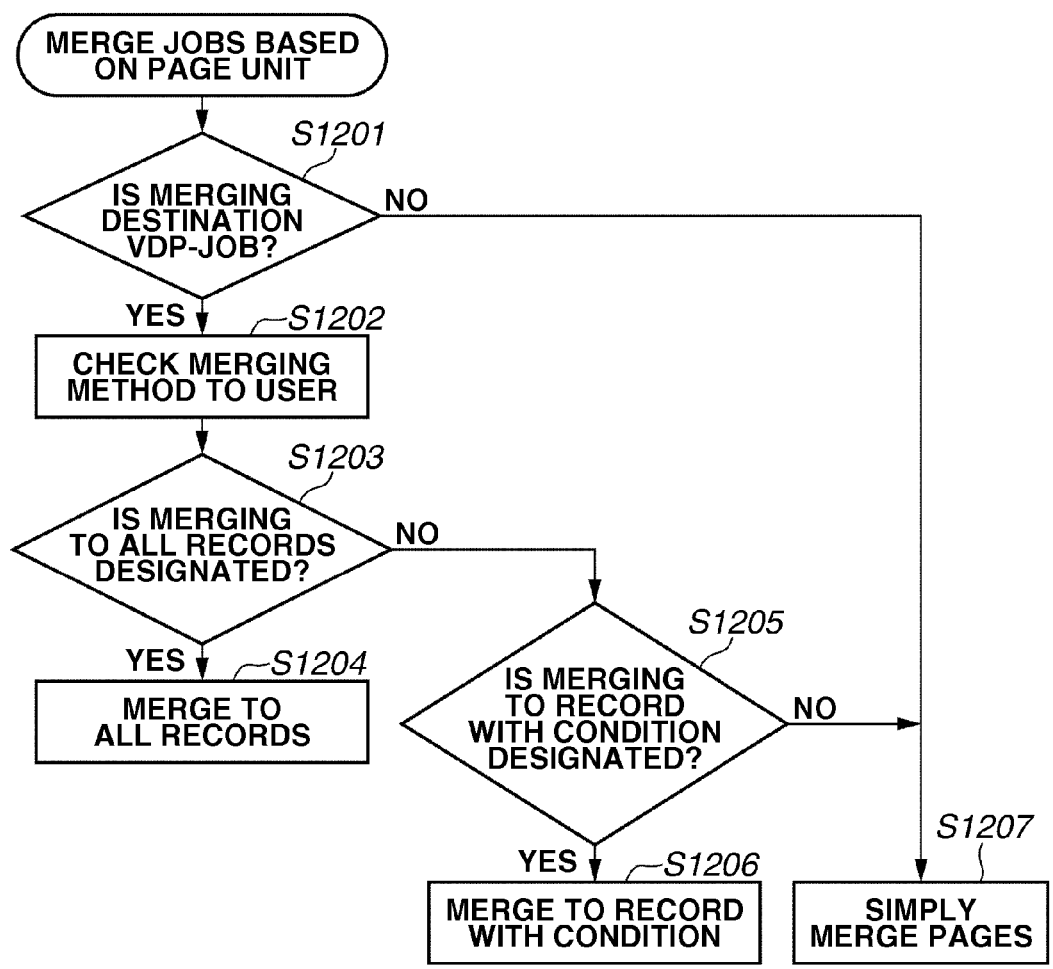
FIG. 12 illustrates a processing flow of merging based on the unit of a page.

FIG. 12 illustrates a processing flow of the CPU 301 when the merging based on the unit of page is designated. The merging based on the unit of page is a merging method for merging, to the print job on the merging destination, at least one page included in another print job.

In step S1201, the CPU 301 determines whether the print job on the merging destination is a VDP job. When the CPU 301 determines that the print job on the merging destination is a VDP job (YES in step S1201), the processing proceeds to step S1202. When the CPU 301 determines that the print job on the merging destination is not a VDP job (NO in step S1201), the processing proceeds to step S1207.

Figure 13:
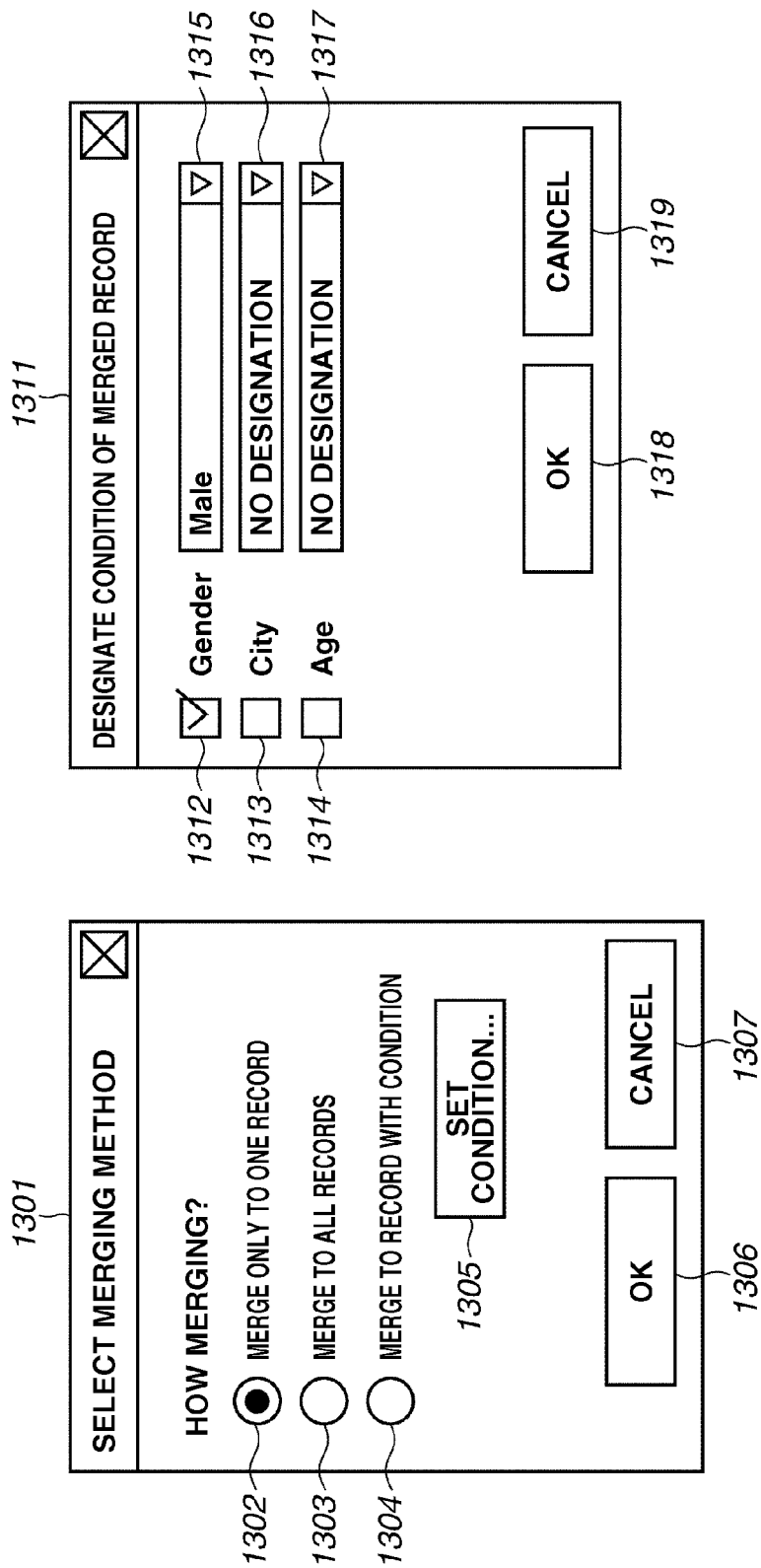
FIG. 13 illustrates a screen example of a dialog box for selecting a merging method based on the unit of the page.

In step S1202, the CPU 301 displays a dialog box for promoting the user to select a merging method on the operation unit 307. FIG. 13 illustrates an example of the dialog box to be displayed at this time. In the dialog box 1301, the user can select, as a merging method of the job, 'merge to only one record' 1302, 'merge to all records' 1303, or 'merge to record with condition' 1304. After selecting the merging method, an OK button 1306 is selected and the processing then proceeds to step S1203. When a cancel button 1307 is selected, the merging processing based on the unit of page is canceled.

The 'merge to only one record' corresponds to 'merge to job' in the merging based on the unit of job. The 'merge to only one record' is a merging method for simply merging the page to the record at the merging designated position. For example, if it is designated that a page (page as the merging target) of another job is merged between the first and second pages of the second record of the VDP job on the merging destination, the page as the merging target is merged only at the merging designated position. At this time, the page as the merging target is not merged to another record included in the VDP job on the merging destination.

The 'merge to all records' is a merging method for merging the page as the merging target to all of a plurality of records included in the VDP job on the merging destination, similarly to the merging based on the unit of job. For example, when it is designated that the page as the merging target is merged between the first and the second pages of the second record in the VDP job on the merging destination, the page as the merging target is merged to not only the second record but also other records. More specifically, the page as the merging target is merged between the first and second pages in all records included in the VDP job on the merging destination.

The 'merge to record with condition' is a merging method for merging the page as the merging target to only the record matching a set condition in the records included in the VDP job on the merging destination. A description is given of a method for setting the condition in the 'merge to record with condition' with reference to FIG. 13.

When a condition setting button 1305 is selected in the dialog box 1301, a dialog box 1311 is displayed on the operation unit 307. The dialog box 1311 is used for designating a condition of a record to be merged. In the 'merge to record with condition', metadata set to the VDP job is used for designating the condition.

The metadata is set to the VDP job based on the unit of record. The metadata is information indicating a feature of the record, and at least one attribute and an attribute value thereof are set to the record. In the example in FIG. 13, three types of attributes including Gender, City, and Age are set to the VDP job. Therefore, the CPU 301 obtains the attribute of metadata set to the VDP job and the attribute value thereof, and displays the dialog box 1311 in which the attribute and the attribute value thereof can be designated as the condition.

Check boxes 1312 to 1314 correspond to the attributes of Gender, City, and Age. The attribute whose check box is checked is used to the condition of the record as the merging target.

Pull-down menus 1315 to 1317 is used to designate the attribute values. When the pull-down menu is selected, all attribute values set to the attribute are displayed for selection with pull-down. Thus the user can designate the attribute for merging the page as the merging target. When the check box 1312 is checked and Male is designated as the attribute value in the pull-down menu 1315, the page as the merging target is merged to only the record with the attribute value of Male in the records included in the VDP job.

In step S1203, the CPU 301 determines whether the 'merge to all records' is selected in the dialog box displayed in step S1202. When the CPU 301 determines that the 'merge to all records' is selected (YES in step S1203), the processing proceeds to step S1204. On the other hand, when the CPU 301 determines that the 'merge to all records' is not selected (NO in step S1203), the processing proceeds to step S1205.

If an OK button 1318 is selected, the condition designated in the dialog box 1311 is updated and the display returns to the dialog box 1301. If a cancel button 1319 is selected, the display returns to the dialog box 1301 without updating the condition designated in the dialog box 1311.

In step S1204, the CPU 301 merges the page as the merging target to all records included in the VDP job. In step S1205, the CPU 301 determines whether the 'merge to record with condition' is selected in the dialog box displayed in step S1202. When the CPU 301 determines that the 'merge to record with condition' is selected (YES in step S1205), the processing proceeds to step S1206. When the CPU 301 determines that the 'merge to record with condition' is not selected (NO in step S1205), the processing proceeds to step S1207.

In step S1206, the CPU 301 merges the page as the merging target to the attribute matching the condition according to the condition designated in the dialog box 1311.

In step S1207, the CPU 301 merges the page as the merging target to the record at the merging designated position.

According to the above-described processing, when at least one page is merged to the print job, processing contents are switched according to as whether the job as the merging target is a VDP job. Thus, the user's desired merging can be realized and the convenience of handling of the VDP job is improved.

According to the present invention, when the merging based on the unit of job or page is designating, according to as whether any of target jobs is a VDP job, it is possible to present to the user whether the conventional merging processing is performed or the merging processing in consideration of the record of the VDP job is performed and enable the user to select any of the merging processing. Consequently, handling convenience of the VDP job can be improved.

Aspects of the present invention can also be realized by a computer of a system or apparatus (or devices such as a CPU or a micro processing unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-191204 filed Aug. 27, 2010, which is hereby incorporated by reference herein in its entirety.

What is claimed is:

1. An image forming apparatus comprising:
a display unit configured to, when at least one of a first print job and a second print job as merging targets is a variable data printing (VDP) job, display a user interface prompting a user to select a merging method for merging the first print job and the second print job; and
a merging unit configured to merge the first print job and the second print job according to the merging method selected via the user interface,
wherein, when one of the first print job and the second print job is the VDP job and the other is not the VDP job, the display unit displays a user interface enabling a selection from a first merging method for merging the non-VDP job in the first print job and the second print job to an individual record included in the VDP job in the first print job and the second print job and a second merging method for merging the first print job and the second print job with one after the other.

2. The image forming apparatus according to claim 1, wherein, when both the first print job and the second print job are the VDP jobs and a number of records included in the first print job matches a number of records included in the second print job, the display unit displays a user interface enabling a selection from the second merging method and a third merging method for merging a record included in the first print job to a record included in the second print job with one-to-one correspondence.

3. An image forming apparatus comprising:
a display unit configured to, when a print job as a merging destination of a page as a merging target containing at least one page is a variable data printing (VDP) job, display a user interface for prompting a user to select a merging method for merging the page as the merging target to the print job; and
a merging unit configured to merge the page as the merging target to the print job according to the merging method selected via the user interface,
wherein the display unit displays a user interface enabling a selection from a first merging method for merging the page as the merging target to an individual record included in the print job and a second merging method for merging the page as the merging target to a designated one among the records included in the print job.

4. The image forming apparatus according to claim 3, further comprising:

a designation unit configured to designate a condition of the record to which the page as the merging target is merged using metadata set to the VDP job,
wherein the display unit displays a user interface enabling a selection from the first merging method, the second merging method, and a third merging method for merging the page as the merging target to a record matching the condition designated by the designation unit among the records included in the print job.

5. The image forming apparatus according to claim 4, wherein the designation unit designates an attribute of the record of the print job and an attribute value of the attribute as the condition, and
the merging unit merges the page as the merging target to the record to which the attribute value designated by the condition is set for the attribute designated by the condition, among the records included in the print job if the third merging method is selected.

6. A method for controlling an image forming apparatus, the method comprising:
displaying, when at least one of a first print job and a second print job as merging targets is a variable data printing (VDP) job, a user interface for prompting a user to select a merging method for merging the first print job and the second print job;
merging the first print job and the second print job according to the merging method selected via the user interface; and
displaying, when one of the first print job and the second print job is the VDP job and the other is not the VDP job, a user interface enabling a selection from a first merging method for merging the non-VDP job in the first print job and the second print job to an individual record included in the VDP job in the first print job and the second print job and a second merging method for merging the first print job and the second print job with one after the other.

7. The method according to claim 6, further comprising displaying, when both the first print job and the second print job are the VDP jobs and a number of records included in the first print job matches a number of records included in the second print job, a user interface enabling a selection from the second merging method and a third merging method for merging a record included in the first print job to a record included in the second print job with one-to-one correspondence.

8. A method for controlling an image forming apparatus, the method comprising:
displaying, when a print job as a merging destination of a page as a merging target containing at least one page is a variable data printing (VDP) job, a user interface for prompting a user to select a merging method for merging the page as the merging target to the print job;
merging the page as the merging target to the print job according to the merging method selected via the user interface; and
displaying a user interface enabling a selection from a first merging method for merging the page as the merging target to an individual record included in the print job and a second merging method for merging the page as the merging target to a designated one among the records included in the print job.

9. The method according to claim 8, further comprising:
designating a condition of the record to which the page as the merging target is merged using metadata set to the VDP job; and displaying a user interface enabling a selection from the first merging method, the second merging method, and a third merging method for merging the page as the merging target to a record matching the designated condition among the records included in the print job.

10. The method according to claim 9, further comprising:
designating an attribute of the record of the print job and an attribute value of the attribute as the condition; and
merging the page as the merging target to the record to which the attribute value designated by the condition is set for the attribute designated by the condition, among the records included in the print job if the third merging method is selected.

11. A non-transitory storage medium storing a computer-executable program, the program causing a computer to execute:
displaying, when at least one of a first print job and a second print job as merging targets is a variable data printing (VDP) job, a user interface for prompting a user to select a merging method for merging the first print job and the second print job; and
merging the first print job and the second print job according to the merging method selected via the user interface,
wherein, when one of the first print job and the second print job is the VDP job and the other is not the VDP job, the display unit displays a user interface enabling a selection from a first merging method for merging the non-VDP job in the first print job and the second print job to an individual record included in the VDP job in the first print job and the second print job and a second merging method for merging the first print job and the second print job with one after the other.

12. A non-transitory storage medium storing a computer-executable program, the program causing a computer to execute:
displaying, when a print job as a merging destination of a page as a merging target containing at least one page is a VDP job, a user interface for prompting a user to select a merging method for merging the page as the merging target to the print job; and
merging the page as the merging target to the print job according to the merging method selected via the user interface,
wherein the display unit displays a user interface enabling a selection from a first merging method for merging the page as the merging target to an individual record included in the print job and a second merging method for merging the page as the merging target to a designated one among the records included in the print job.

* * * * *